United States Patent
Jonckheere et al.

(10) Patent No.: US 10,477,763 B2
(45) Date of Patent: Nov. 19, 2019

(54) DUAL CUT HEADER ASSEMBLY

(71) Applicant: CNH Industrial America LLC, New Holland, PA (US)

(72) Inventors: Marc R.M. Jonckheere, Snellegem (BE); Karel C.F. Pauwels, Ingelmunster (BE); Koen Teetaert, Koolskamp (BE); Erik Vermote, Torhout (BE)

(73) Assignee: CNH Industrial America LLC, New, PA (US)

( * ) Notice: Subject to any disclaimer, the term of this patent is extended or adjusted under 35 U.S.C. 154(b) by 13 days.

(21) Appl. No.: 15/294,253

(22) Filed: Oct. 14, 2016

(65) Prior Publication Data
US 2017/0105343 A1 Apr. 20, 2017

(30) Foreign Application Priority Data
Oct. 14, 2015 (BE) .................... 2015/5657

(51) Int. Cl.
*A01D 41/14* (2006.01)
*A01D 47/00* (2006.01)
*A01D 41/06* (2006.01)
*A01D 45/00* (2018.01)

(52) U.S. Cl.
CPC ............ *A01D 41/141* (2013.01); *A01D 41/06* (2013.01); *A01D 41/147* (2013.01); *A01D 45/00* (2013.01); *A01D 47/00* (2013.01)

(58) Field of Classification Search
CPC ...... A01D 41/14; A01D 41/06; A01D 41/147; A01D 41/141; A01D 34/8355; A01D 45/00; A01D 47/00
USPC .................................................. 56/229, 504
See application file for complete search history.

(56) References Cited

U.S. PATENT DOCUMENTS

| 2,401,513 A * | 6/1946 | Schmidt ................. A01D 47/00 56/238 |
| 3,596,447 A * | 8/1971 | Makeham .............. A01D 41/06 56/10.7 |
| 3,596,448 A * | 8/1971 | Van Buskirk ........ A01D 45/021 56/63 |

(Continued)

FOREIGN PATENT DOCUMENTS

| DE | 3606030 A1 * | 8/1986 | ......... A01D 34/8355 |
| EP | 0212185 A1 * | 3/1987 | ......... A01D 34/8355 |

(Continued)

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

A dual cut header assembly a header, a chopper suspended from the header, and at least one actuator is provided between the chopper and the header for adapting a distance between the chopper and the header. The dual cut header assembly further includes at least one sensor for measuring a state of the chopper, and an actuator steering module connected to the at least one actuator. The header is provided to be lifted by an agricultural combine to cut crop material from a field at a first height. The chopper is provided to cut the crop material at a second height lower than the first height. The actuator steering module is configured to automatically adapt the distance based on the measured state.

11 Claims, 3 Drawing Sheets

(56) References Cited

U.S. PATENT DOCUMENTS

| | | | | | |
|---|---|---|---|---|---|
| 4,715,174 | A | * | 12/1987 | Lloyd | A01D 41/06 56/189 |
| 4,845,931 | A | * | 7/1989 | Bruner | A01D 41/141 56/10.2 R |
| 5,433,065 | A | * | 7/1995 | Mosby | A01D 34/8355 56/13.9 |
| 7,661,251 | B1 | * | 2/2010 | Sloan | A01D 41/141 56/10.2 E |
| 7,707,811 | B1 | * | 5/2010 | Strosser | A01D 41/141 56/10.2 E |
| 7,874,135 | B2 | * | 1/2011 | Nagy | A01D 45/021 56/504 |
| 8,220,236 | B1 | * | 7/2012 | Benner | A01D 47/00 56/63 |
| 8,572,942 | B2 | | 11/2013 | Dietrich | |
| 9,485,908 | B2 | * | 11/2016 | Verhaeghe | A01D 34/8355 |
| 2007/0209347 | A1 | * | 9/2007 | Malmros | A01D 41/08 56/126 |
| 2014/0075911 | A1 | * | 3/2014 | Huang | A01D 41/12 56/122 |
| 2014/0165527 | A1 | * | 6/2014 | Oehler | A01D 34/435 56/229 |
| 2014/0237980 | A1 | * | 8/2014 | Verhaeghe | A01D 41/145 56/320.1 |
| 2014/0311115 | A1 | * | 10/2014 | Verhaeghe | A01D 34/8355 56/251 |
| 2014/0319253 | A1 | * | 10/2014 | Nurnberg | A01D 34/8355 241/101.4 |
| 2016/0165799 | A1 | * | 6/2016 | Missotten | A01D 41/14 56/229 |
| 2016/0183460 | A1 | * | 6/2016 | Missotten | A01D 41/145 56/229 |
| 2016/0270291 | A1 | * | 9/2016 | van Vooren | A01D 34/8355 |

FOREIGN PATENT DOCUMENTS

| | | | | |
|---|---|---|---|---|
| EP | 0786200 | A2 | 7/1997 | |
| EP | 1378159 | A1 * | 1/2004 | ........ A01D 34/8355 |
| EP | 1378159 | A1 | 1/2004 | |
| EP | 1378159 | * | 2/2004 | ............ A01D 41/14 |
| FR | 2329183 | A2 | 5/1977 | |
| FR | 2730126 | * | 7/1995 | ............ A01D 41/06 |
| FR | 2730126 | A1 * | 8/1996 | ........ A01D 34/8355 |
| FR | 2794608 | A1 * | 12/2000 | ........ A01D 34/8355 |
| GB | 2153197 | A * | 8/1985 | ............ A01D 41/06 |
| JP | 6033128 | B2 * | 11/2016 | ............ A01D 41/06 |
| WO | WO-9853660 | A1 * | 12/1998 | ............ A01D 41/14 |
| WO | 2007133098 | A1 | 11/2007 | |

* cited by examiner

DUAL CUT HEADER ASSEMBLY

CROSS REFERENCE TO RELATED APPLICATION

This application claims priority to Belgium Application No. 2015/5657 filed Oct. 14, 2015, the contents of which are incorporated herein by reference.

BACKGROUND OF THE INVENTION

The present invention relates to a dual cut header assembly particularly to a sunflower header.

The optimal harvesting height of sunflowers is very depending on the height of the plant. In some fields, this height can vary from 3 m to less than 1 m. Furthermore, it is an advantage for the operator of the agricultural vehicle or the farmer to have a constant, relatively short stubble height once the agricultural vehicle has harvested the sunflower seeds. Therefore, the sunflower header is formed as a dual cut header assembly comprising a header and a chopper. The header is provided to be lifted by the agricultural vehicle to cut the top part of the crop material, or the sunflowers, from the field at a first height. The chopper is suspended from the header and provided to cut the remaining crop material at a second height which is lower than the first height. Thereby, such dual cut header assembly has the possibility to harvest the sunflowers at a height that can vary from 3 m to 1 m via the header, while, via the chopper, the assembly can cut the stems and stalks close to the ground surface so that only a short stubble remains on the field.

Using existing dual cut header assemblies, the operator has to control the height of the header, so that sunflowers, or other crop material, can be cut at an optimal height for harvesting. Thereby, typically this height is manually controlled based on visuals and experience of the operator. While controlling the height of the header, the height of the chopper also changes along with the height of the header, because the chopper is suspended from the header. Typically, the chopper is suspended from the header via at least one actuator. The operator of the agricultural vehicle also manually controls the height of the chopper to cut the stalks and stems close to the ground surface at a desired height. A disadvantage of this configuration is that controlling the two heights requires a significant concentration and experience. Particularly, the optimal heights are not constant so that the operator is constantly adjusting the two heights. As a result of this, the maximum driving speed wherein the operator is able to control these heights is limited. Increasing the driving speed would not allow the operator to optimally control both the height of the header and the height of the chopper.

Attempts have been made to hydraulically couple the height of the chopper to the height of the header via a master slave configuration with hydraulic actuators. Tests have shown that such coupling does not lead to the desired result because other factors also influence the optimal distance between the header and the chopper. One example of such factors is the flatness of the field. Also, when the agricultural vehicle carrying the sunflower header is provided with a rear lift system, so that the height of the rear wheels can be adjusted based on environmental parameters, the ideal distance between header and chopper is significantly influenced by the settings of the rear lift system. When testing this header with a hydraulic master slave coupling between header and chopper it has become clear that when the chopper height is too low, the chopper touches the ground surface and digs in to the ground surface so that, when the agricultural vehicle is driven forward over the field, a bulldozer effect is obtained eventually blocking the correct further operation of the vehicle. When the chopper is too high, the stalks and stems that remain on the field are too high and make further operations on the field difficult. Both situations are therefore highly undesired.

It is an object of the present invention to provide a dual cut header assembly wherein an optimal chopper height can be more easily achieved.

SUMMARY OF THE INVENTION

To this end, the present invention provides a dual cut header assembly comprising a header and a chopper, wherein the header is provided to be lifted by an agricultural combine to cut crop material at a field a first height, and wherein the chopper is suspended from the header and provided to cut the crop material at a second height lower than the first height, wherein at least one actuator is provided between the chopper and the header for adapting a distance between the chopper and the header, the dual cut header assembly further comprising at least one sensor for measuring a state of the chopper and comprising an actuator steering module connected to the actuator and configured to automatically adapt the distance based on the measured state.

By measuring a state of the chopper via at least one sensor, and automatically adapt the distance between the header and the chopper by steering the actuator via an actuator steering module, the height of the chopper with respect to the ground surface can be automatically optimized. This relieves the operator of the agricultural vehicle to monitor and change the chopper's height, so that the operator can focus on the height of the header. Tests have shown that this allows the operator to drive significantly faster over the field. Furthermore, since the chopper height is automatically controlled, the height of the stubble remaining on the field is significantly more constant.

Preferably, the state of the chopper is one of the height of the chopper with respect to the ground surface and the pressure exerted by the chopper on the ground surface. When the height of the chopper with respect to the ground surface is measured, the actuator steering module can steer the actuator to keep the height constant, substantially constant or at least within a predetermined range. When the pressure exerted by the chopper on the ground surface is measured by the sensor, the actuator steering module can be configured to steer the actuator to keep this pressure constant, substantially constant or at least within a predetermined range. When a height measurement is used as a sensor, the height of the chopper with respect to the ground surface can be automatically controlled. When a pressure sensor is used, the height between the chopper and the ground surface is considered to be zero since the chopper at least partially rests on the ground surface thereby exerting a pressure on the ground surface.

According to a first embodiment of the present invention the actuator steering module comprises an accumulator and wherein the sensor is formed as a pressure sensor for measuring the pressure exerted by the chopper on the ground surface. This embodiment of the present invention is based on the insight that an actuator combined with a hydraulic accumulator operates as a spring carrying at least part of the weight of the chopper. The accumulator is configured to provide a predetermined hydraulic pressure at one end of the actuator. This predetermined hydraulic pressure has, in combination of the diameter of the actuator, the effect that a substantially constant upward force is exerted by the actuator. Thereby, this upward force is chosen so that a portion of the weight of the chopper is carried by the actuator while another part of the weight leans on the ground surface thereby exerting a force on the ground surface. By partially carrying the weight of the chopper via the actuators, the bulldozer effect which typically occurs when the chopper weight rests on the ground surface, can be controlled. This is surprising since conventional dual cut assemblies, in use, were blocked and further operation was prevented once the chopper started bulldozering in the ground surface.

Preferably, the sensor is mounted to the accumulator to measure the pressure in the accumulator thereby indirectly measuring the pressure exerted by the chopper on the ground surface. The pressure in the accumulator is, due to the hydraulic connection, substantially equal to the pressure in one end of the actuators. Knowledge of this pressure therefore indirectly provides knowledge about the part of the weight that is carried by the actuator. Because the chopper has a known total weight, and the part of the weight that is carried by the actuator is known by knowing the pressure in the accumulator, the remaining pressure exerted by the chopper on the ground surface is deducible. Thereby, by measuring directly or indirectly via the sensor the pressure in the accumulator, the pressure exerted by the chopper on the ground surface is known. The sensor can be mounted physically in the accumulator, can be mounted in the actuator or is preferably mounted in the hydraulic line between the accumulator and the actuator. Providing a pressure sensor to measure pressure in an accumulator is easy to realize and therefore a preferred solution. Preferably considering the dusty and dirty environments wherein the dual cut header assembly will be used, having such easy and reliable sensor to measure the pressure exerted by the chopper on the ground surface is an advantage.

Preferably, the accumulator is provided to be connected to a hydraulic on/off valve at the agricultural vehicle so that the pressure in the accumulator is controllable to be within a predetermined range. In theory, an accumulator keeps a constant pressure. In practice, due to the limited dimensions of the accumulator, the pressure in the accumulator can vary when the actuator is operated. To compensate for this variation of pressure in the accumulator, the accumulator is connected to a hydraulic on/off valve at the agricultural vehicle. Via such valve, the accumulator can be loaded to increase the pressure or can be offloaded to release pressure. The advantage of such configuration compared to other configurations is that the accumulator only requires an hydraulic on/off valve, and not a proportional valve. Most existing agricultural vehicles, adapted for carrying such dual cut header assembly, have some free hydraulic on/off valves at a front end thereof, which valves can then be used to control the accumulator. Such configuration of the dual cut header assembly thereby allows a conventional existing agricultural vehicle to control the distance between the chopper and the header. The simplicity of this configuration has proven to be reliable and easy to implement in existing situations.

Preferably, the pressure is selectable via a user interface by an operator of the agricultural vehicle. By this, the pressure exerted by the chopper on the ground surface can be set. Once this pressure has been set, the system automatically controls the header assembly so that no further intervention of the operator is required. However, by making the range selectable via a user interface by an operator, the operational settings can be chosen by the operator as the situation and/or the environment requires.

Preferably, the actuator steering module is configured to carry at least 50%, preferably at least 70%, more preferably around 80% of the weight of the chopper so that the pressure exerted by the chopper on the ground surface was limited to 50%, 30% or 20% of its weight, respectively. Tests have shown that the bulldozering effect is minimal and the cutting height of the stalks and stems is optimally controlled when the chopper exerts maximally 50%, preferably maximally 30%, more preferably maximally 20% of its weight on the ground surface.

Preferably, the chopper is provided with sliding skids for minimizing the bulldozer effect when sliding the chopper over the ground surface. The sliding skids are dimensioned by the skilled person to carry the remaining weight that is exerted on the ground surface while minimizing the bulldozer effect. The sliding skids are shaped in the form of skies. Alternatively, to sliding skids, the chopper can be provided with wheels to minimize the bulldozer effect when leaning with the chopper on the ground surface.

According to a second embodiment of the present invention, the sensor is formed as a height sensor for measuring the height between the ground surface and the chopper and the actuator steering module is adapted for keeping the height within a predetermined range. When a height sensor is used, the chopper can be controlled to float over the ground surface, thereby not touching the ground surface or only touching the ground surface with the height sensor. Such system also allows to cut the stalks and stems at a predetermined height close to the ground surface while automatically adjusting the distance between the header and the chopper based on the sensor measurement.

Preferably, the predetermined height is selectable via a user interface by an operator of the agricultural vehicle. Thereby, the height of the chopper from the ground surface is selectable by the operator of the agricultural vehicle so that the height of the chopper can be optimized by the operator based on the situation and the operator's experience. Once the predetermined height, preferably defined as a range, has been selected by the operator, the system automatically keeps the chopper at the height, preferably within the selected range. Therefore, after selecting the height, the operator is relieved from further monitoring the height of the chopper.

Preferably, the actuator steering module is provided to be connected to a hydraulic proportional valve at the agricultural vehicle so that the actuator is controllable to keep the height, preferably within the predetermined range. Via a proportional valve, the actuator can be precisely controlled so that the height of the chopper can be held at a predetermined distance from the ground surface, or at least within a predetermined range from the ground surface.

Preferably, the first height is selectable by the operator of the agricultural vehicle. By making the first height selectable, the operator can choose a setting for the chopper depending on the environment and wishes of the operator. After setting of the first height, the chopper is held at his first height via the sensor and actuator steering module.

Preferably, actuator blocking means are provided between the actuator and the actuator steering module so that the actuator position can be fixed when the actuator blocking means are used. Actuator blocking means will typically be used when maneuvering with the agricultural vehicle. By blocking the actuator, the header can be lifted and the chopper will be lifter along with the header. Without the blocking means, lifting of the header will only result in the distance between the chopper and the header to be increased so that the chopper remains close to or exerting a pressure on the ground surface.

Preferably, the dual cut header assembly is a sunflower header. Sunflower headers are the most known headers in which a dual cutting is used and proven to be advantageous.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
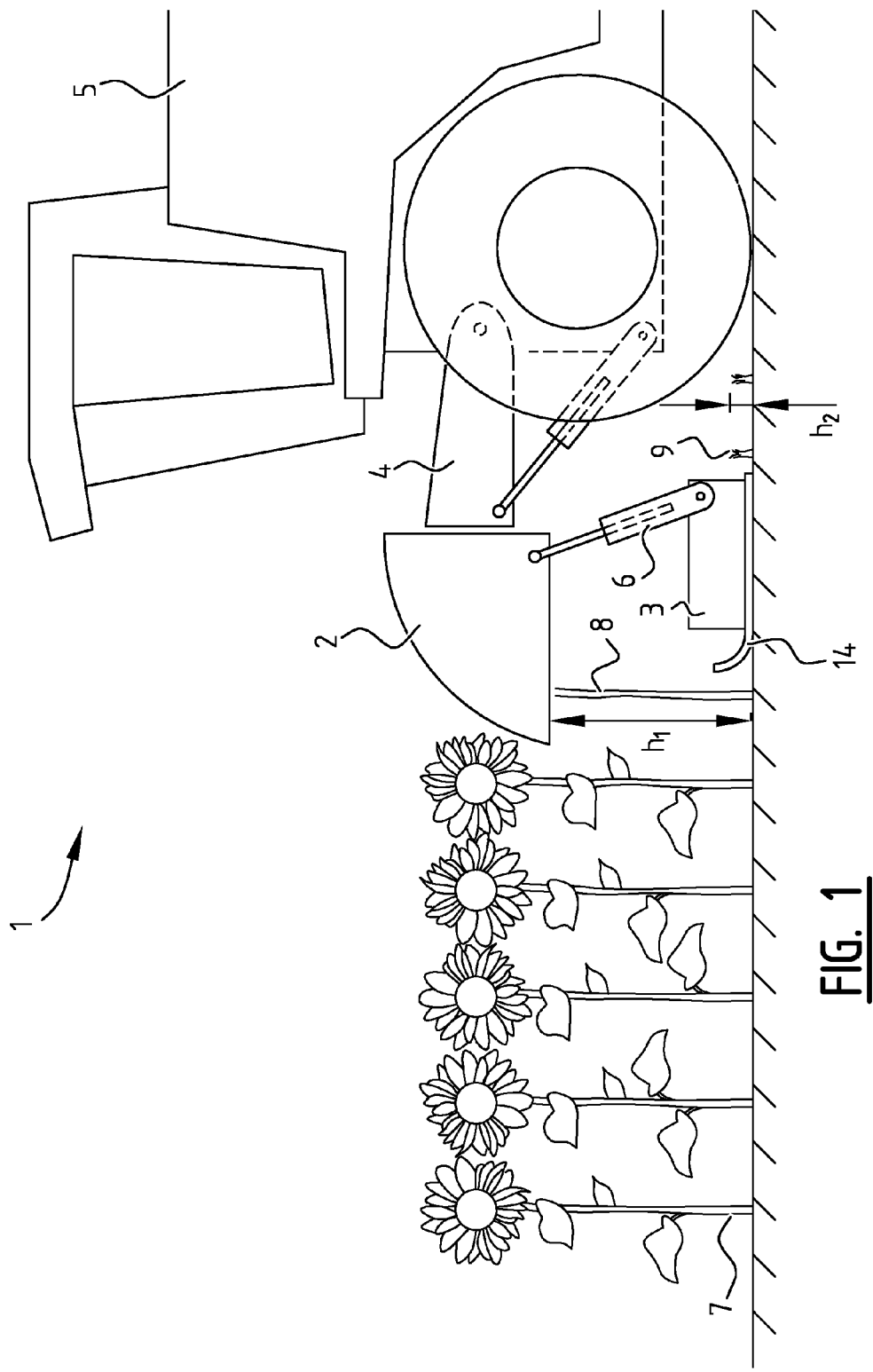
FIG. 1 illustrates a dual cut header assembly mounted to an agricultural combine.

FIG. 1 illustrates a dual cut header assembly 1 in a real life situation. The dual cut header assembly 1 comprises a header 2 and a chopper 3. The dual cut header assembly 1 is connected to an agricultural vehicle 5, particularly to an agricultural combine 5 via the feeder 4 thereof. The agricultural combine 5 typically comprises a lifting means for varying the height of the feeder 4, so that the header assembly 1 can be lifted via the feeder 4.

Figure 2:
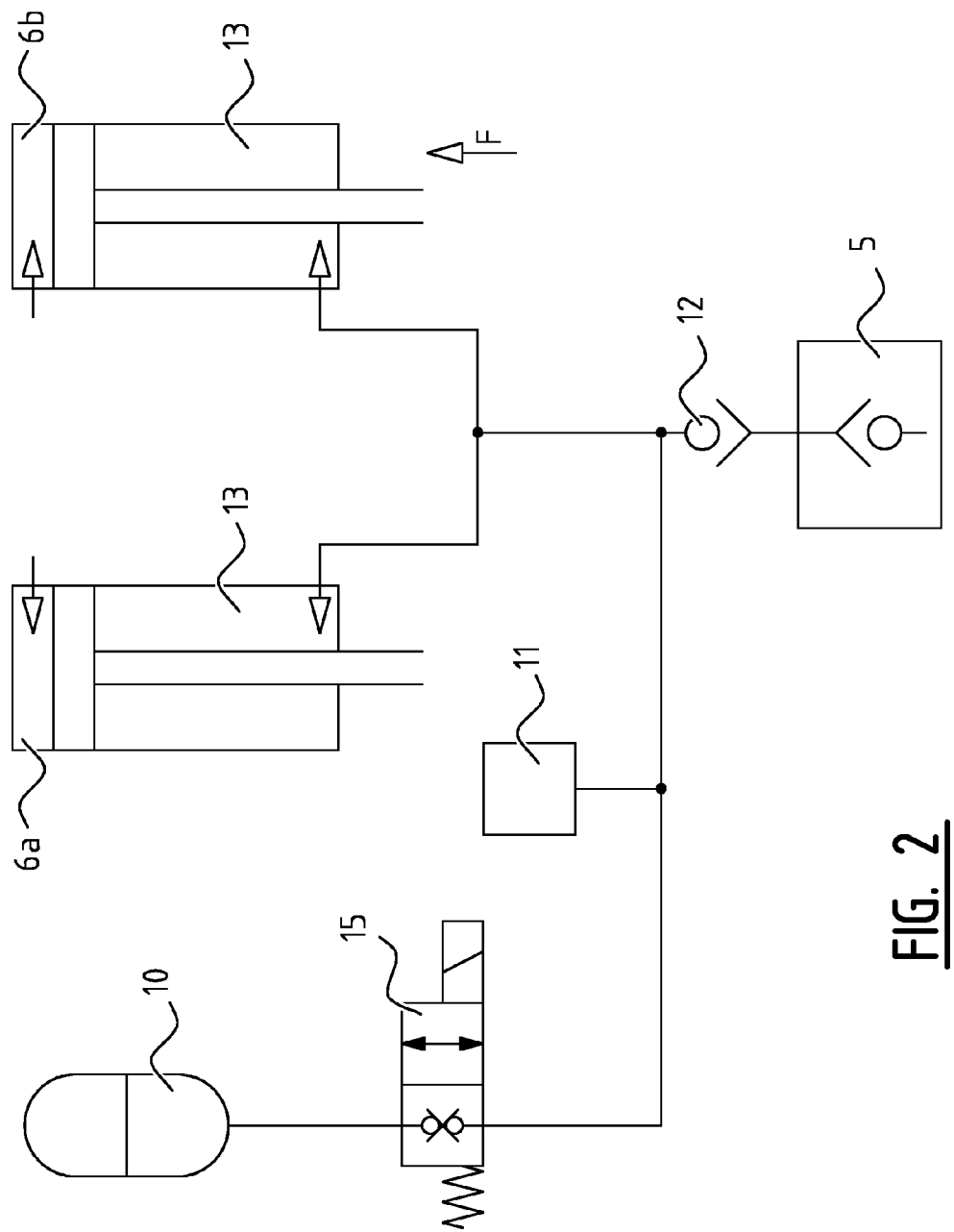
FIG. 2 illustrates a schematic setup of a first embodiment for use in the dual cut header assembly of the invention.

Lifting of the header assembly 1 allows the header 2 to be positioned at a first height H1. The chopper 3 is connected to the header 2 solely via an actuator 6. The actuator 6 thereby provides the structural connection between the chopper 3 and the header 2 such that the carrying, i.e., lifting, forces are transmitted entirely through the actuator 6. The actuator 6 allows the distance between the chopper 3 and the header 2 to be adjusted. The chopper 3 therefore operates at a second height H2, which is significantly smaller than the first height H1. Thereby, crop material 7 such as sunflowers can be harvested in an efficient way. The top segment of the crop material 7 is cut by the header 2, and gathered via the feeder 4 into the agricultural combine 5. Furthermore, the chopper 3 cuts the stalks and stems 8 at a second height H2 so that only short stubble remains after the chopper 3 has passed. The short stubble is illustrated in the figure with reference number 9. The distance between the header 2 and the chopper 3 is according to the invention automatically controlled. To this end, the actuator 6 is automatically steered by an actuator steering mechanism. FIG. 2 illustrates a first embodiment of such steering mechanism.

FIG. 2 shows two actuators 6A and 6B which are preferably one-way hydraulic cylinders. These hydraulic cylinders 6A and 6B are mounted between the header 2 and the chopper 3 at a horizontal distance from each other. One end of the hydraulic cylinders 6A and 6B is connected to an accumulator 10. Via the accumulator 10 a substantially constant pressure can be provided at the one end 13 of the hydraulic cylinder 6A and 6B. Due to this substantially constant pressure, a predetermined force F can be exerted by the hydraulic cylinders 6. This force F is typically an upward force exerted on the chopper 3 so that at least part of the weight of the chopper 3 is lifted by the hydraulic cylinder 6A and 6B. Preferably, a pressure sensor 11 is provided for measuring directly or indirectly the pressure in the accumulator 10 thereby also measuring the pressure in the hydraulic cylinders 13.

By measuring the pressure 11, the force F can be determined since the force F is directly related to the pressure in the cylinder 6. By regulating the pressure in the first end 13 of the cylinders 6, a predetermined part of the weight of the chopper 3 is carried via the actuators 6 by the header 2. This allows to regulate the remaining pressure that is exerted by the chopper on the ground surface. In combination with sliding skids 14, provided at an underside of the chopper 3, the chopper 3 can be slid over the ground surface without bulldozer effect. This is not only the result of a sliding skid, but also of the accumulators 6 carrying at least a part of the weight of the chopper 3.

The accumulator 10 is preferably connected to the agricultural vehicle 5 via a quick-coupling 12 to a valve. This valve, connected to the coupling 12, can be an on/off valve and can be used to regulate the pressure in the accumulator 10, measured by sensor 11, within a predetermined range. As described above, the pressure is directly proportional to the force F exerted by the cylinders 6. Most existing agricultural combines 5 have, at a front end thereof, some remaining couplings 12 comprising or connected to on/off valves for connection of external elements. An advantage of the set-up of FIG. 2 is that therefore it can be used by any existing agricultural combine 5.

The system preferably further comprises a blocking valve 15 for blocking the free hydraulic connection between the accumulator 10 and the hydraulic cylinders 6. Via this blocking element, the position of the hydraulic cylinders can be substantially fixed, so that the chopper can be lifted from the ground surface.

Figure 3:
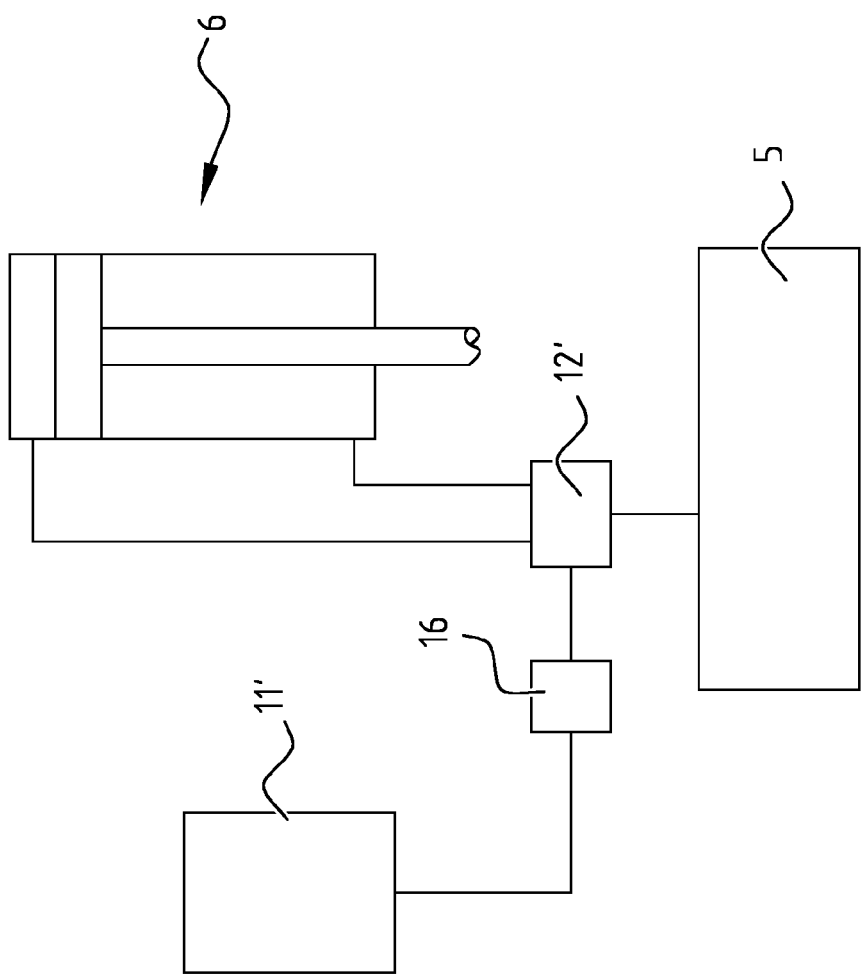
FIG. 3 illustrates a schematic setup of a second embodiment for use in the dual cut header assembly of the invention.

FIG. 3 schematically illustrates a further embodiment of the invention. Thereby, FIG. 3 also shows a hydraulic cylinder 6, mountable between the header 2 and the chopper 3 of the dual cut header assembly 1. In the embodiment of FIG. 3, the sensor 11 is a height sensor 11'. This height sensor 11' is adapted to measure the height of the chopper with respect to the ground surface. This height sensor 11' can be a contact sensor or a contactless sensor such as an optical sensor. The sensor output of the distance sensor 11' is processed by a module 16, which based on the measured height 11' steers a proportional valve 12'. The proportional valve 12' is in the figure schematically illustrated, and the skilled person will understand that this proportional valve 12' is typically located on the combine 15. In an alternative configuration, a proportional valve 12' is provided at the header and hydraulically connected to the hydraulic system of the combine 15. Via the proportional valve 12' the cylinder 6 can be controlled, and the force exerted by the cylinder can be adjusted. When the embodiment of FIG. 3 is implemented, the chopper typically floats over the ground surface at a distance from the ground surface. A drawback of this embodiment is that a proportional valve 12' should be provided to control the actuator 6. Such proportional valve 12' is more expensive and is in conventional existing agricultural combines not always free for use.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A dual cut header assembly comprising;
a header;
a chopper suspended from the header;
an actuator system consisting of one or more hydraulic cylinders having a first end connected to the chopper and a second end connected to the header for adapting a distance between the chopper and the header such that the actuator system solely connects the chopper to the header;
at least one sensor for measuring a state of the chopper in the form of a pressure exerted by the chopper on a ground surface, the at least one sensor is a pressure sensor for measuring the pressure exerted by the chopper on the ground surface; and
an actuator steering module connected to the actuator system, the actuator steering module comprises a hydraulic accumulator,
wherein the header is provided to be lifted by an agricultural vehicle to cut crop material from a field at a first height, and the first height is selectable by an operator of the agricultural vehicle,
wherein the chopper is provided to cut the crop material at a second height lower than the first height, and
wherein the actuator steering module is configured to automatically adapt the distance based on the measured state of the chopper for automatically keeping the chopper at its second height.

2. The dual cut header assembly according to claim 1, wherein the at least one sensor is mounted to the accumulator to measure a pressure in the accumulator, thereby indirectly measuring the pressure exerted by the chopper on the ground surface.

3. The dual cut header assembly according to claim 2, wherein the accumulator is configured to be connected to a hydraulic on/off valve at the agricultural vehicle so that the pressure in the accumulator is controllable to be within a predetermined range.

4. The dual cut header assembly according to claim 3, wherein the predetermined range is selectable via a user interface by an operator of the agricultural vehicle.

5. The dual cut header assembly according to claim 1, wherein the actuator steering module is configured to carry at least 50% of the weight of the chopper so that a pressure exerted by the chopper on the ground surface is limited to 50% of its weight.

6. The dual cut header assembly according to claim 1, wherein the chopper comprises sliding skids for minimizing a bulldozer effect when sliding the chopper over the ground surface.

7. The dual cut header assembly according to claim 1, further comprising an actuator blocking valve between the actuator system and the actuator steering module so that a position of the actuator system can be fixed when the actuator blocking valve is used.

8. The dual cut header assembly of claim 1, wherein the dual cut header assembly is a sunflower header.

9. The dual cut header assembly of claim 1, wherein the chopper is cantilevered from the header by the actuator system.

10. The dual cut header assembly of claim 2, wherein the chopper at least partially rests on the ground surface such that a height between the chopper and the ground surface is zero.

11. The dual cut header assembly of claim 10, wherein the accumulator provides a predetermined hydraulic pressure for the actuator system and operates as a spring providing an upward force for carrying at least part of a weight of the chopper such that the actuator steering module automatically regulates the pressure exerted by the chopper on the ground surface to automatically adapt the distance between the chopper and the header based on the measured state of the chopper.

* * * * *